Sept. 25, 1945. T. F. JOHNSON 2,385,708
HOOK AND LATCH FOR LINE IMPLEMENTS
Filed Jan. 26, 1944
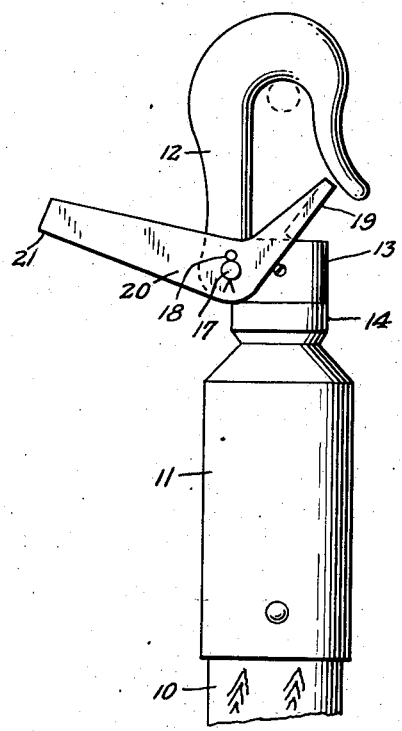
Fig.1.
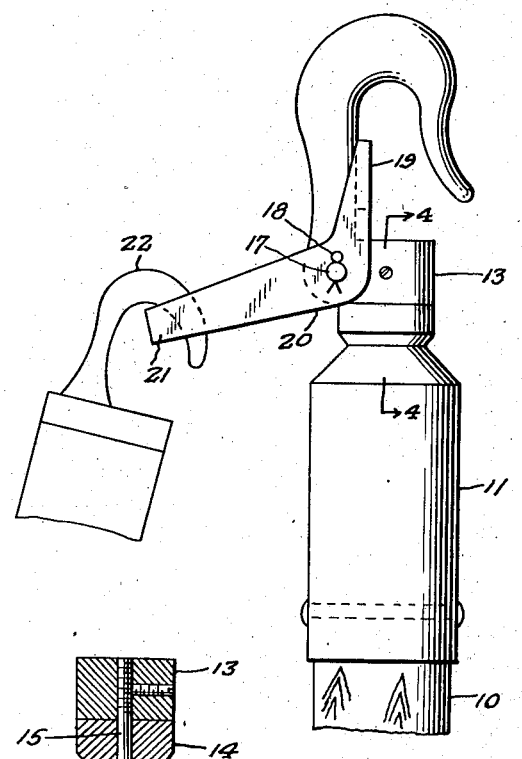
Fig.2.
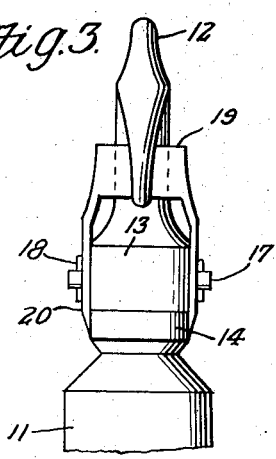
Fig.3.
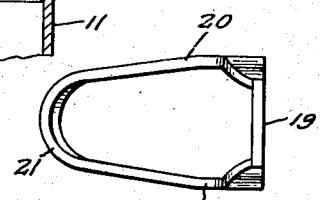
Fig.4.
Fig.5.
Inventor
T. F. Johnson.
By A. D. Adams
Attorney Patented Sept. 25, 1945

2,385,708

UNITED STATES PATENT OFFICE 2,385,708

HOOK AND LATCH FOR LINE IMPLEMENTS

Tomlinson F. Johnson, Atlanta, Ga.

Application January 26, 1944, Serial No. 519,798

1 Claim. (Cl. 294—19)

This invention relates to line implements for use on high tension transmission lines and aims to provide an improved hook and safety latch for tension sticks of the type shown in my Patent No. 2,246,630, issued June 24, 1941. The principal idea is to provide a novel friction latch which can be manipulated directly by a switch hook or other type of implement and which does not depend upon a spring to hold it closed.

Other aims and advantages of the invention will appear in the specification, when considered in connection with the accompanying drawing, wherein:

Figure 1 is a fragmentary side elevation of a tension stick embodying the preferred form of hook and latch;

Fig. 2 is a view similar to Fig. 1, showing the latch opened;

Fig. 3 is a front elevation of Fig. 1;

Fig. 4 is a sectional view taken on the line 4—4 in Fig. 2; and

Fig. 5 is a top plan view of the latch.

Referring more particularly to the drawing, the improved hook and latch assembly is shown as being applied to one end of an ordinary tension stick which is usually made of hard wood or other insulating material, so that the stick can be used on live lines, it being understood that the opposite end of the stick is provided with an ordinary swivel eye to receive a rope of the tackle, reference being made to my aforesaid patent.

In this instance, a collar or ferrule 11 is secured to the stick and a hook 12 is swivelly mounted on the upper end of the collar. The hook is shown as having a cylindrical base 13 mounted on a head 14 on the collar and a bolt or pin 15 (Fig. 4) is swivelly mounted in the head to hold the base of the hook assembled thereon.

The opposite sides of the base of the hook are shown as having machined faces on which a stirrup-shaped latch, made of one piece, is pivotally and frictionally mounted by means of a pin or shaft 17, which is shown as having cotter pins 18 to retain it in place. However, the pin may be an ordinary bolt.

In this instance, the latch has a lip 19 to coact with the bill of the hook and confine a conductor in the bight portion. It has two side arms 20 which are shaped like a bell-crank and are joined behind the hook to form a U-shaped operating arm 21 adapted to be engaged by a switch hook 22 to open or close the latch. The latch is made of more or less resilient metal, such as bronze and is adapted to be sprung into frictional gripping engagement with the machined faces of the bosses. It is contemplated that a bolt having a lock-nut may be employed to exert gripping pressure on the arms when the bosses become worn.

It will be understood that the hook is adapted to engage a conductor when the bill is opened. The latch can easily be closed by pushing upwardly on it and it will not open until it is pulled downwardly, as shown in Fig. 2. The U-shaped latch arm is easily accessible to an operator when the hook is rotated to any position on the swivel mounting. It is more easily accessible than the cam operating member shown in my prior patent.

From the foregoing description, it will be seen that the novel hook and latch assembly is easily manufactured and applied to a tension stick. It has no parts which can easily be broken. It will stand rough treatment and is dependable in operation.

Obviously, the invention is not limited to the particular embodiment thereof herein shown and described.

What is claimed is:

In combination with a tension stick for high tension transmission lines, a collar on one end of the stick having a head; a hook having a cup-shaped base swivelly mounted on the head; bosses on the base at the shank of the hook; and a stirrup-shaped safety latch pivotally and frictionally mounted on the bosses.

TOMLINSON F. JOHNSON.